United States Patent [19]

Tan

[11] 4,141,073
[45] Feb. 20, 1979

[54] KEYLESS ELECTRONIC CALCULATING PEN

[76] Inventor: Lu-Jan Tan, 45-11 Junction Blvd., Corona, N.Y. 11368

[21] Appl. No.: 822,311

[22] Filed: Aug. 8, 1977

[51] Int. Cl.² ............................ G06F 3/02; G06F 7/38
[52] U.S. Cl. ........................... 364/705; 340/146.3 SY; 364/709
[58] Field of Search ....................... 364/705, 709; 340/146.3 SY; 235/64

[56] References Cited

U.S. PATENT DOCUMENTS

| | | | |
|---|---|---|---|
| 3,617,708 | 11/1971 | Bongiovanni | 235/64 |
| 3,937,939 | 2/1976 | Frenkel | 364/705 X |
| 4,007,364 | 2/1977 | Ojima et al. | 364/705 |
| 4,029,915 | 6/1977 | Ojima | 364/709 |
| 4,070,649 | 1/1978 | Wright, Jr. et al. | 340/146.3 SY |

Primary Examiner—David H. Malzahn
Attorney, Agent, or Firm—Burns, Doane, Swecker & Mathis

[57] ABSTRACT

Keyless Electronic Calculating Pen comprises a portable combination of a pen and an electronic calculator. Signals generated by the pen tip through designated strokes of numerals and calculating symbols upon writing on any surface of any writing medium are input directly to the calculator to perform calculating and displaying functions. The written record can be kept for checking and future reference.

6 Claims, 5 Drawing Figures

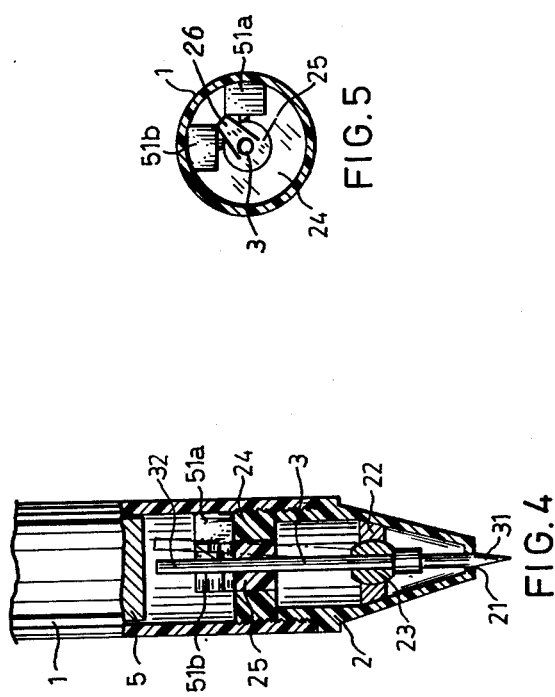

KEYLESS ELECTRONIC CALCULATING PEN

FIELD OF INVENTION

The present invention relates to a keyless electronic calculating pen and more particularly to an implementation constitutes a combination of a writing pen and an electronic calculator. Signals generated by the pen tip through writing on any surface of any writable medium following designated strokes of numerals and calculating symbols are input to the calculator to perform calculating and displaying functions. Besides, the written record can be kept for checking and future reference.

BACKGROUND OF INVENTION

Electronic calculators are very popular today. Miniaturization in dimension has become possible since the development and application of IC, LSI and LCD and the manufacturing cost is greatly reduced. It is well known that key panel operation is indispensible during use of an ordinary electronic calculator, and in order to record during calculation, paper and pen are necessary accessories which sometimes are not available at hand. For larger size desk top type calculators, a paper roll for printing of the record is often provided, and some super-thin size calculators are therefore incorporated with a small pad of paper and a minipen as a pocket-book set for convenience. A commodity so called a calcu-pen has been marketed in the form of an aggregated key-operated calculator and pen. However, independent operations for note taking and calculation are required. More recently, a calculator has been disclosed with an electronic pen connected to the calculator by a conductive lead, instead of conventional key operation, and the pen is used to carryout the calculation. Yet drawbacks remain to be improved upon, since the said electronic pen has to be used with a specifically designed plate or with the aid of certain mediums and the numerals and calculation records can only individually or temporarily appear and can not be kept wholly and permanently.

SUMMARY OF INVENTION

Therefore, the main object of the present invention is to provide a keyless calculating pen, by writing with the pen tip on any writable surface such as a piece of paper or board through designated strokes of numerals and calculating symbols to effect the functions of calculating and displaying without key panel operation, and the written record can be kept for checking and future reference.

Another object of the present invention is to provide a keyless electronic calculating pen comprising a portable combination of a pen and an electronic calculator. A clip is provided to facilitate carrying the implement in a pocket.

Still another object of the present invention is to provide a keyless electronic calculating pen, and since only displaying facility is required without a key panel, simplicity and good appearance are assured, and hence a low cost.

A further object of the present invention is to provide a keyless electronic calculating pen, in which a signal is generated by pressing of a pen tip against any writable surface of any material with precoded stokes as an input into the calculator to perform the functions of calculating and displaying.

Further objects and features will become apparent from the following detailed descriptions to be taken in conjunction with the annexed drawings.

BRIEF DESCRIPTION OF DRAWINGS

FIG. 4 is a partial cutaway front view showing the signal input section of the pen tip;

FIG. 5 is a partial sectional top view showing the signal input section of the pen tip; and FIG. 6 is an example showing a coding relationship between numerals/calculating symbols and designated strokes.

Figure 1:
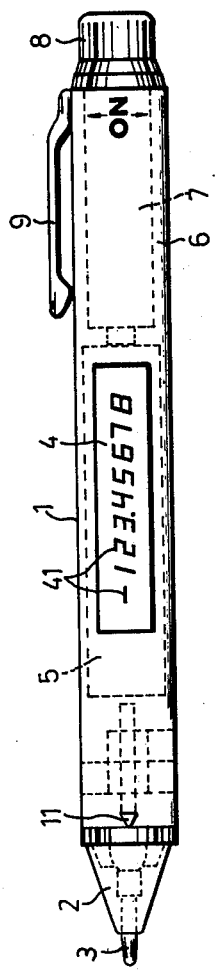
FIG. 1 is a schematic drawing showing an embodiment of the general appearance of the keyless electronic calculating pen of the present invention.

DETAILED DESCRIPTION OF EMBODIMENTS:

Now referring to FIG. 1, the appearance of the electronic calculating pen of the present invention is substantially the same as that of an ordinary ball point pen comprising a tubular barrel 1, a conical head 2 wherein a refill 3 is retained. A displaying window 4 is disposed near the central surface of the barrel to display the numerals being calculated and the result of calculation 41. Within the barrel 1, circuit means 5 of signal input transfering, calculating, and displaying are contained. A cell chamber 6 is provided at the rear part of the barrel 1 to hold a dry cell 7. A cap 8 also functions as a switch for the power source and is disposed at the rear end of barrel 1. The cap 8 is detachable freely from the barrel 1 to facilitate replacement of a dry cell and is capable of being rotated a small angle clockwise or counterclockwise to actuate the power source. A clip 9 is provided near the rear end of barrel 1 to facilitate carrying in a pocket.

Figure 2:
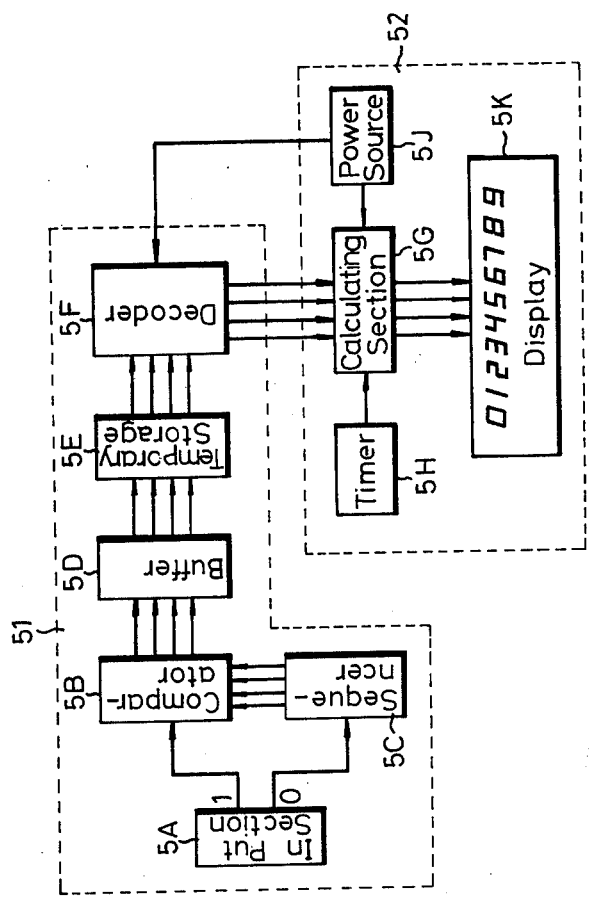
FIG. 2 is an operating block diagram showing inner circuitry of the present invention.

In the block diagram of FIG. 2, signal input transfering section 51 and calculating section 52 are respectively denoted by dotted line blocks. Calculating section 52 is of a conventional type which usually receives a signal input by operating a plurality of prearranged keys which actuate the circuit thereby effecting calculating and displaying. Yet in the present invention, the keys are eliminated, and precoded strokes of the pen tip against a writing surface are used to actuate two signal switches to produce electric signals and for transfer to the calculating and displaying circuit to effect calculating and displaying. In other words, the transfering section 51 of the present invention is a substitute for conventional key panel. Through designated strokes of the pen tip against any writable surface, signal so generated is transfered to the output from the transfering section 51 and input into the calculating section 52 after comparing, memorizing, and decoding processes, to simulate a conventional key panel operation.

Figure 3:
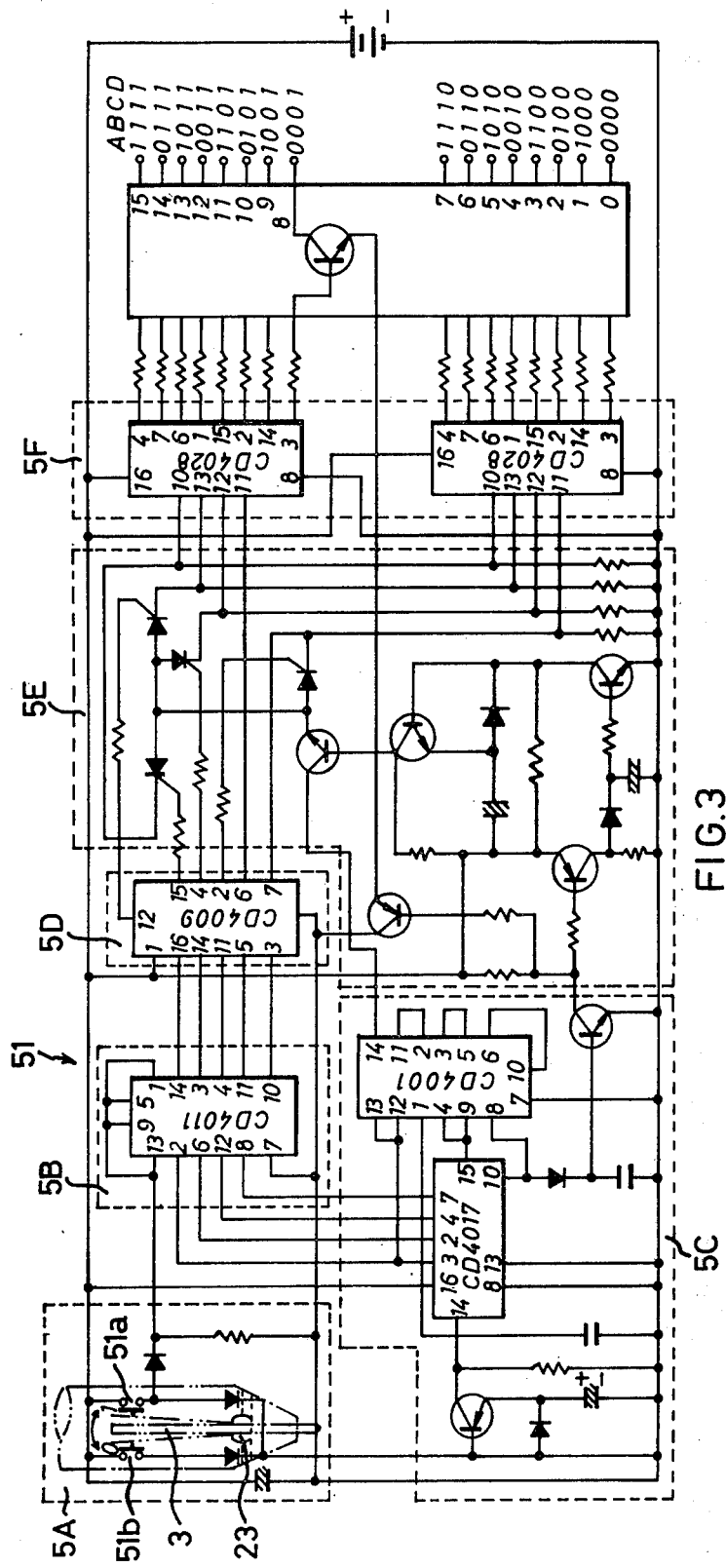
FIG. 3 is an embodiment of the circuitry of transferring section for the input signal of the pen tip.

Input section 5A of the signal transfering section 51 serves to generate electric signals through stroke operation of the pen tip against a writable surface of any material. Details of the designation or coding of the strokes for numerals or calculating symbols will be explained later. Referring also to FIG. 3, through actuated of a pair of micro-switches 51a–51b, a signal of zero ("0") or one ("1") is generated to the input to an comparator 5B and a sequencer 5C for designating a signal "1" or "0", and the signal is thereby counted.

After being buffered by Buffer 5D, the signals are input to a Temporary storage composed of an SCR circuit. Once the last digit code of the preset number of digits (four in the present example) is output from the sequencer 5C, temporary storage 5E reaches a balance and outputs the 4 digit code a to decoder 5F, and after decoding therein, a circuit corresponding to a conventional key panel operation is actuated. In other words, sixteen (16) sets of four (4) digit codes of a binary system representing the numerals 0 to 9 and calculating symbols +, −, ×, ÷, = and E (for eliminating) are able to be transferred to the input to the calculating section 5G with the aid of a timer 5H. A power source 5J and the displaying section 5K are the same as in a conventional calculator, and are not described in further detail.

FIG. 3 depicts a circuit of signal input transfering section 51, and numerals corresponding those used in the block diagram in FIG. 2 are used here to represent the same parts as aforementioned. Since the circuitry is known to those skilled in the art, it therefore warrents no further detail here. The circuit of calculating section 52 also known.

To summarize, the feature of the present invention is to combine a signal input transfering section 51 and calculating section 52 so that it is possible to transfer input signals generated through strokes of a pen tip against any writable surface without specifying the material of the said surface, and no key panel operation or other code reader are required to effect calculation. The abovesaid circuit which can be composed with an IC, LSI, etc. of small volume to reduce the size of construction is also familiar to those skilled in the art.

FIGS. 4 and 5 depict an embodiment of the structure of a pen tip which serves as a signal input. Pen head 2 located at the front end of barrel 1 is connected with thread means. Through central opening 21 of head 2, a ball pen refill 3 is inserted in a ball joint 23 retained in a support 22 to enable a universal movement thereabout. Tip 31 of refill 3 sticks out of the head 2 with the rear end 32 inserted through a circular ring 25 of elastic material such as rubber which is seated in a circular support 24 threaded to the rear end of head 2. The rear end 32 of refill 3 is free to swing in directions caused by the pressing of tip 31 with a designated stroke. With the ball joint 23 a as fulcrum, the rear end 32 of refill 3 is capable of swinging against the elastic ring support 25 toward any direction such as shown by the dotted lines in FIG. 4.

A pair of micro-switches 51a, 51b are disposed a at right angle and separated by a spacer 26 such as shown in FIG. 5. The said pair of switches 51a, 51b serve the purpose as illustrated in input section 5A of FIG. 3 to generate the signal "0" or "1" through the swinging of rear end 32 of refill 3 to close respectively switch 51a or 51b upon up-down stroke or left-right stroke of the pen tip 31. A mark 11 is disposed at the boundary between pen head and the front end of barrel 1 (FIG. 1) to give correct orientation of pen-holding so that the desired effect of a designated stroke is assured without going astray. During writing, rear end 32 of refill 3 swings to selectively touch switch 51a or 51b, and upon releasing of writing pressure, rear end 32 resumes a neutral position with the aid of the restoring nature of the elastic ring 25.

Since the purpose of calculation of the present invention is fulfilled by the designated stroke of numerals and symbols through pen tip 31 to effect actuation of switches 51a, 51b to output a signal "0" or "1" to transfering section 51 thereby to transfer the same as an input signal into the calculating section 52, it is therefore important to define writing strokes for each numeral or symbol. A four-digit code is adopted in the embodiment of the present invention, wherein each up-down stroke gives a "1" signal and each left-right stroke a "0" signal. The assigned code and strokes for each numeral and symbol are shown in FIG. 6 which should be followed strictly but are not difficult to learn. Of course this system may be redefined as any soft ware in programming.

The main feature of the present invention is to effect calculating and displaying through direct writing. No specific surface of writing is required, and it is so convenient and of great interest. It may stimulate the learning interest of children, and therefore it may function as an educational toy, and yet it has practical value to effect calculation. The said implement can also be used as an ordinary pen by just switching off the power source through turning of the cap 8.

The above embodiment is given only for illustration purpose and not by way of limitation, and modifications will become evident to those skilled in the art which will fall within the scope of the attached claims.

I claim:

1. A keyless electronic calculating pen, comprising:
   a writing implement shaped in the form of a pen;
   a writing refill disposed within said writing implement and supported within said writing implement by a ball joint such that a first end of said writing refill is freely movable in response to application of pressure to a second end of said writing refill during a writing operation;
   a calculation and display circuit disposed within said writing implement; and
   switch means located within said writing implement for sensing movement of said first end of said writing refill and transmitting a binary digital signal to said calculation and display circuit in response to sensed movement, whereby movement of said writing implement in a first direction during writing causes said switch means to transmit a first binary signal to said circuit, and movement of said writing implement in a second direction during writing causes said switch means to transmit a second binary signal to said circuit.

2. A keyless electronic calculating pen according to claim 1, wherein said writing implement comprises:
   a tubular barrel including a forward section in which said calculating and display circuit is housed, a middle section having a display window, and a rearward section in which a power source for said circuit is housed;
   a conical head portion attached to said forward section of said tubular barrel, said writing refill being supported within said conical head portion; and
   a detachable cap connected to said rearward section of said tubular barrel, said cap functioning as a switch for connecting the power source to said calculating and display circuit.

3. A keyless electronic calculating pen according to claim 1, wherein said second end of said writing refill protrudes through said conical head portion, further wherein said conical head portion includes an elastic ring surrounding said writing refill and located near said first end of said writing refill, said elastic ring maintaining said first end in a neutral position when no pressure is applied to said second end of said writing refill.

4. A keyless electronic calculating pen according to claim 1, wherein said switch means includes a pair of microswitches disposed at a right angle with respect to each other and a spacer means for maintaining said microswitches in predetermined positions, said microswitches being actuated by said first end of said writing refill upon movement thereof.

5. A keyless electronic calculating pen according to claim 1, wherein said calculating and display circuit comprises:
   a signal transfer circuit including an input circuit for receiving the signals transmitted by said switch means, a sequencer and a comparator for processing said received signals to determine the binary states of the received signals, a storage means for successively storing the states of received signals, and a decoder for decoding the stored information; and
   a calculation circuit including a calculating section for receiving and processing the decoded information, a timer for controlling the receipt of information by said calculating section; a display actuated by said calculating section; and a power source for driving said calculating and display circuit.

6. A keyless electronic calculating pen according to claim 1, further including an orientation mark located on the exterior of said writing implement for indicating proper positioning of said calculating pen during writing.

* * * * *